(12) United States Patent
Hogle

(10) Patent No.: US 6,523,463 B1
(45) Date of Patent: Feb. 25, 2003

(54) CONTROLLED BURN SMOKING DEVICE

(76) Inventor: Richard E. Hogle, 12426 Littlerock Rd., Olympia, WA (US) 98512

( * ) Notice: Subject to any disclaimer, the term of this patent is extended or adjusted under 35 U.S.C. 154(b) by 3 days.

(21) Appl. No.: 09/715,430

(22) Filed: Nov. 17, 2000

(51) Int. Cl.⁷ .............................. A47J 37/00; F24B 3/00
(52) U.S. Cl. ...................... 99/482; 99/447; 126/25 B; 126/163 R
(58) Field of Search .................. 99/481, 482, 467, 99/446, 447; 126/25 B, 79, 25 R, 9 R, 163 R

(56) References Cited

U.S. PATENT DOCUMENTS

| | | |
|---|---|---|
| 1,078,071 A | 11/1913 | Tait |
| 3,132,639 A * | 5/1964 | Roberts ...................... 126/25 R |
| 3,245,398 A * | 4/1966 | Baker ........................ 126/25 R |
| 3,684,087 A * | 8/1972 | Anderson ............. 126/25 R X |
| 3,974,760 A | 8/1976 | Ellis .............................. 99/482 |
| 4,213,381 A | 7/1980 | Ellis .............................. 99/446 |
| 4,233,890 A | 11/1980 | Jansen .......................... 99/340 |
| 4,257,391 A | 3/1981 | Carin |
| 4,592,334 A | 6/1986 | Logan, Jr. .................. 126/25 R |
| 5,070,777 A * | 12/1991 | Novak .......................... 99/482 |
| 5,536,518 A * | 7/1996 | Rummel .................... 126/25 R |
| 5,950,614 A | 9/1999 | Guinnane .................. 126/25 R |

* cited by examiner

*Primary Examiner*—Reginald L. Alexander
(74) *Attorney, Agent, or Firm*—Robert L. Shaver; Frank J. Dykas; Stephen M. Nipper

(57) ABSTRACT

A device for smoking food items using charcoal briquettes as fuel. The device has a channel into which the charcoal briquettes are placed so that ignition of one of the charcoal briquettes will result in eventual ignition of the adjacent charcoal briquette. The device is preferably placed in a standard barbecue grill, thereby allowing a user to smoke meat or fish using charcoal briquettes and the charcoal barbecue grill they already own.

11 Claims, 7 Drawing Sheets

CONTROLLED BURN SMOKING DEVICE

BACKGROUND OF THE INVENTION

1. Field of the Invention.

The present invention generally relates to devices used to smoke food, and more specifically to devices which use heat-producing blocks, such as charcoal briquettes, to smoke food.

2. Background Information.

Many people enjoy the flavor and taste of smoked foods, in particular, smoked meats. When smoking meat, the process requires a fairly low temperature, such as about 125° Fahrenheit, over a long period of time. Few people have a smoker, but many people have a conventional charcoal barbecue grill. The combination of low temperature over a long period of time is hard to achieve in a conventional charcoal barbecue grill, because the charcoal gets too hot and burns up too fast. While such a high heat and quick burning environment is perfect for grilling meats, it is very inappropriate for the smoking of meats. Along with low heat, you also need a steady supply of a wood that gives off a desired flavor, such as mesquite or hickory. This aromatic smoke imparts a smoke flavor to the fish or meat being smoked. However, such wood tends to burn up fast if applied directly to charcoal briquettes, and therefore necessitates having the operator of the grill constantly add small amounts of the aromatic smoking wood on a continual basis to the charcoal grill in order to arrive at a smoking environment.

What is needed is a way to use a conventional charcoal barbecue grill to smoke meats and/or fish. The present invention solves this need.

SUMMARY OF THE INVENTION

The present invention is a device for smoking food items. This device is preferably used in the standard charcoal barbecue grill, such as a Weber® barbecue grill. It may also be used in gas grills. The device uses at least two charcoal briquettes for fuel, with these briquettes arranged so that the adjacent briquettes touch one another. The device also has a generally elongated bar, having a first end which extends to a second end. This bar has at least one longitudinal bend in it, thereby providing a shape. This shape could be any shape desirable by the manufacturer or user of the device, including simple shapes where the bend simply bends the first end back towards the second end so that a U-shaped shape is formed with the bend defining a bar first portion and bar second portion with a channel defined as the area between the first portion and the second portion. Many other shapes are contemplated including (but not limited to) the circular spirals, triangular spirals, rectangular spirals, and other shapes. Within the channel will be located the charcoal briquettes placed in an end-to-end fashion. The device also has a charcoal briquette supporting means. The support means can be a separate grated surface, or could be an appendage of the bar itself, so long as the charcoal briquettes placed in the channel are supported from falling through the channel.

Thus in use, the charcoal briquettes are placed in the channel upon the charcoal briquette supporting means, and the device is placed within the typical barbecue grill shell with a grilling surface located above the device. Then the user of the device would light one of the charcoal briquettes, preferably one of the charcoal briquettes located on the end of the end-to-end line of charcoal briquettes. This charcoal briquette would burn, and at a certain point, would ignite the adjacent charcoal briquette(s). This adjacent charcoal briquette would then burn, and eventually ignite the charcoal briquette adjacent to it, so that a minimal number of charcoal briquettes would be lit and burning at any time, and would continually ignite additional briquettes as the fire burned over time. This results in the effect of having a low temperature, long burning, consistent burning fire ideal for the smoking of meat and fish.

A second channel is also preferably located attached adjacent to the first channel, this second channel for holding chips of a smoke-producing material or wood, such as hickory or mesquite wood. Thus, as the fire burns through and along the first channel, the second channel which is adjacent parallel to the first channel will be exposed to the heat of the burning charcoal and will release smoke as the burning of the charcoal briquettes in the first channel takes place.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
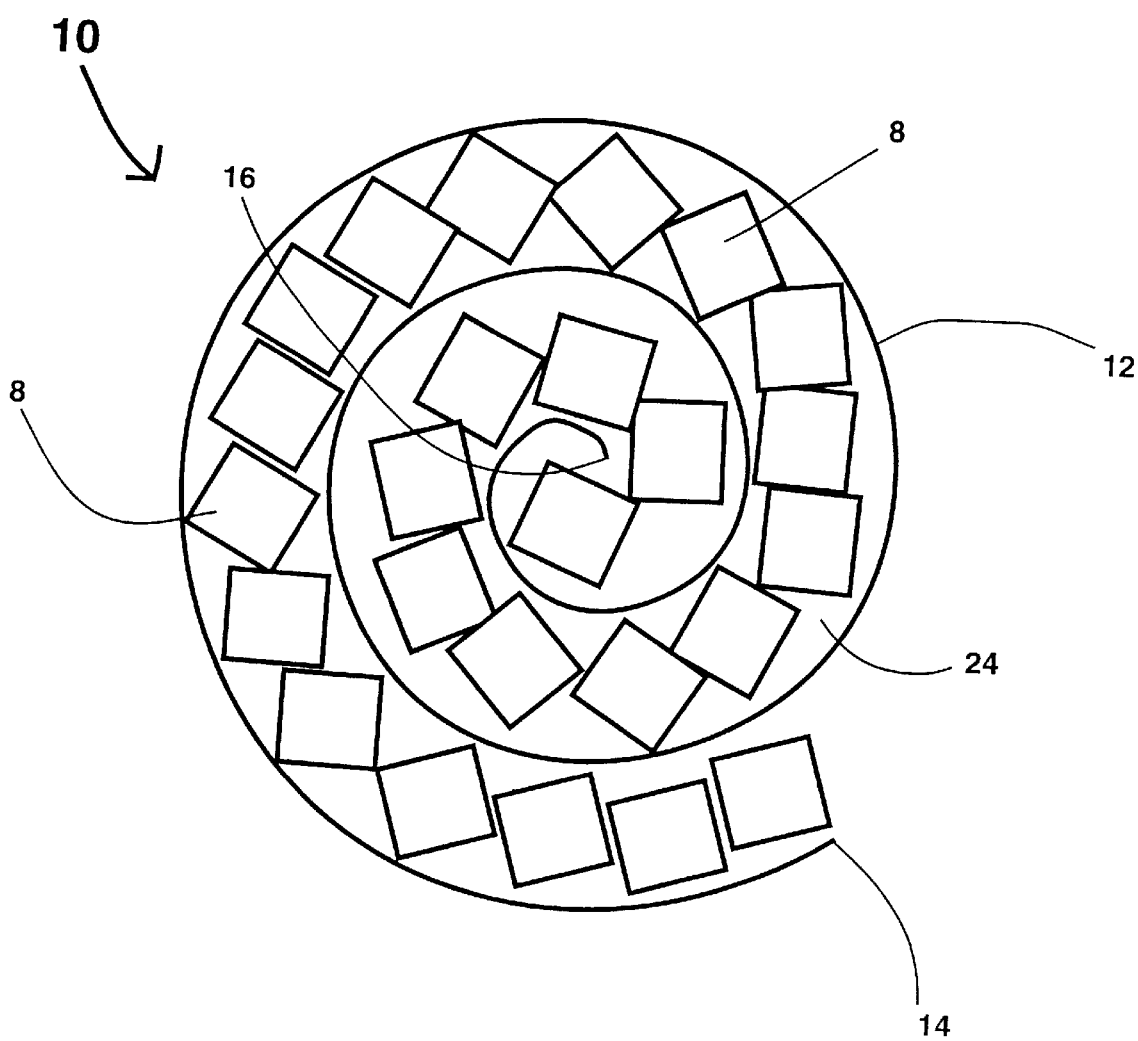
FIG. 1 is a top view of a first embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a device for smoking food items. Referring initially to FIG. 1, shown is a top view of one embodiment of the present invention. The smoking device 10 preferably uses at least two heat-producing blocks 8, such as charcoal briquettes, as fuel. The device 10 itself comprises a structure having a bar 12 having a first end 14 extending to a second end 16. It is preferred that the bar 12 be laterally bent in at least one location. Shown in FIG. 1 is the bar being bent generally continually in a circular spiral pattern. These bends define a channel 24 which exists within the device. It is preferred that said channel 24 be generally horizontal, however, non-horizontal channels are also possible. It is into this channel 24 that heat producing blocks such as charcoal briquettes 8 are placed. These charcoal briquettes 8 are placed in a side-to-side or end-to-end fashion through at least a portion of the channel 24. Then in use, the user is able to ignite one of said heat producing blocks 8, and the heat producing blocks adjacent to the ignited heat producing block will in turn be ignited, and will in turn ignite any adjacent heat producing blocks over time.

Figure 2:
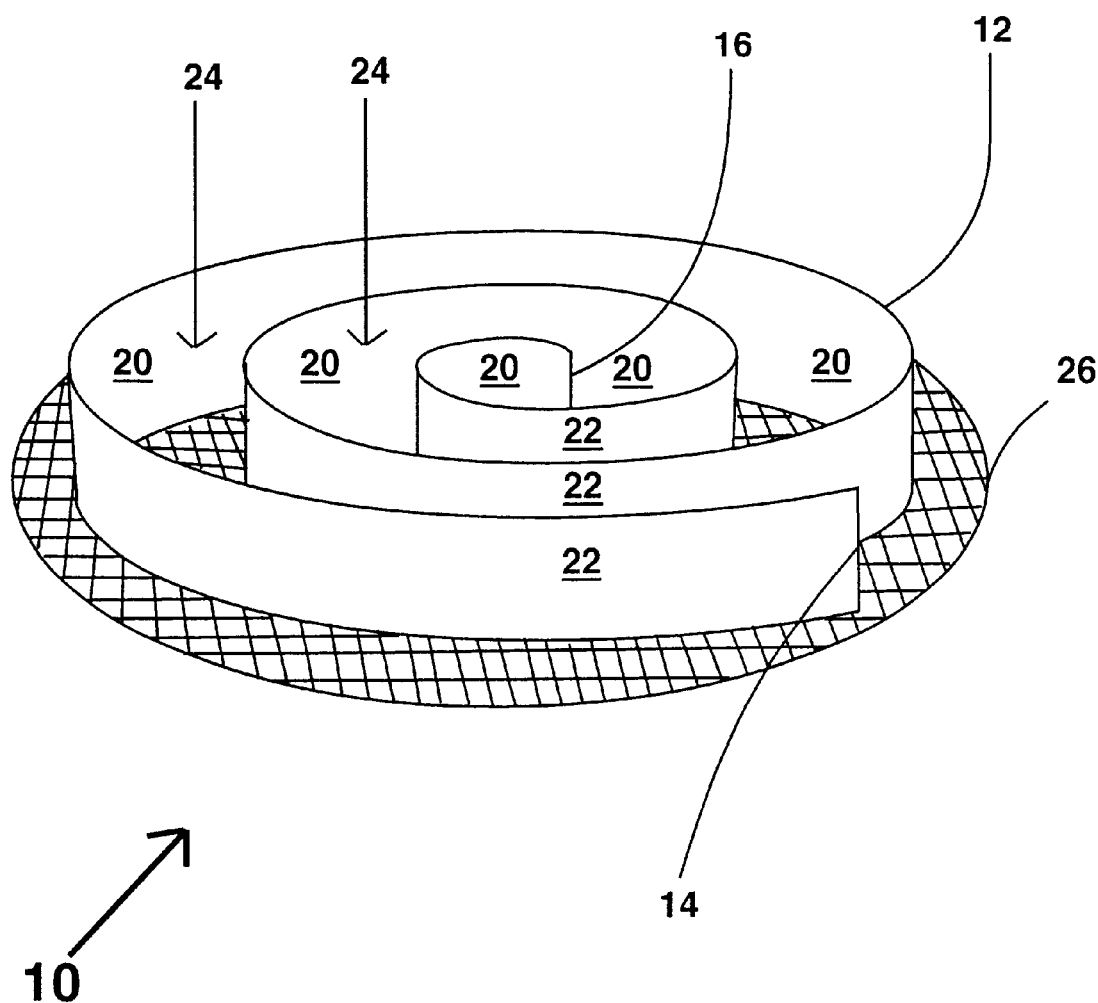
FIG. 2 is a side perspective view of a second embodiment of the present invention.

Referring now to FIG. 2, a side perspective view of a second embodiment of the present invention is shown. This embodiment shows the use in an optional heat producing block supporting means 26. This support means 26 can be a separate grating or other apparatus for horizontal support of heat producing blocks, or can be an appendage or extension of the bar 12 itself. What is important is that the heat producing blocks supporting means 26 be able to support the heat producing blocks 8 held in the channel 24.

Still referring to FIG. 2, the smoking device 10 has a first end 14 extending to a second end 16, in this case extending in a circular spiral fashion. The Figure also recognizes the fact that in such an arrangement, the bar 12 has a first portion or first side 20 and second portion or second side 22. It is between a first portion 20 which faces a second portion 22 that a channel 24 exists. Within this channel 24 are to be placed the heat producing blocks 8 (not shown). The device 10, in this embodiment, rests upon or is attached to a heat producing block support means 26. Alternately, the support means 26 could be an appendage tab or other extension of the bar 12 itself.

Figure 3:
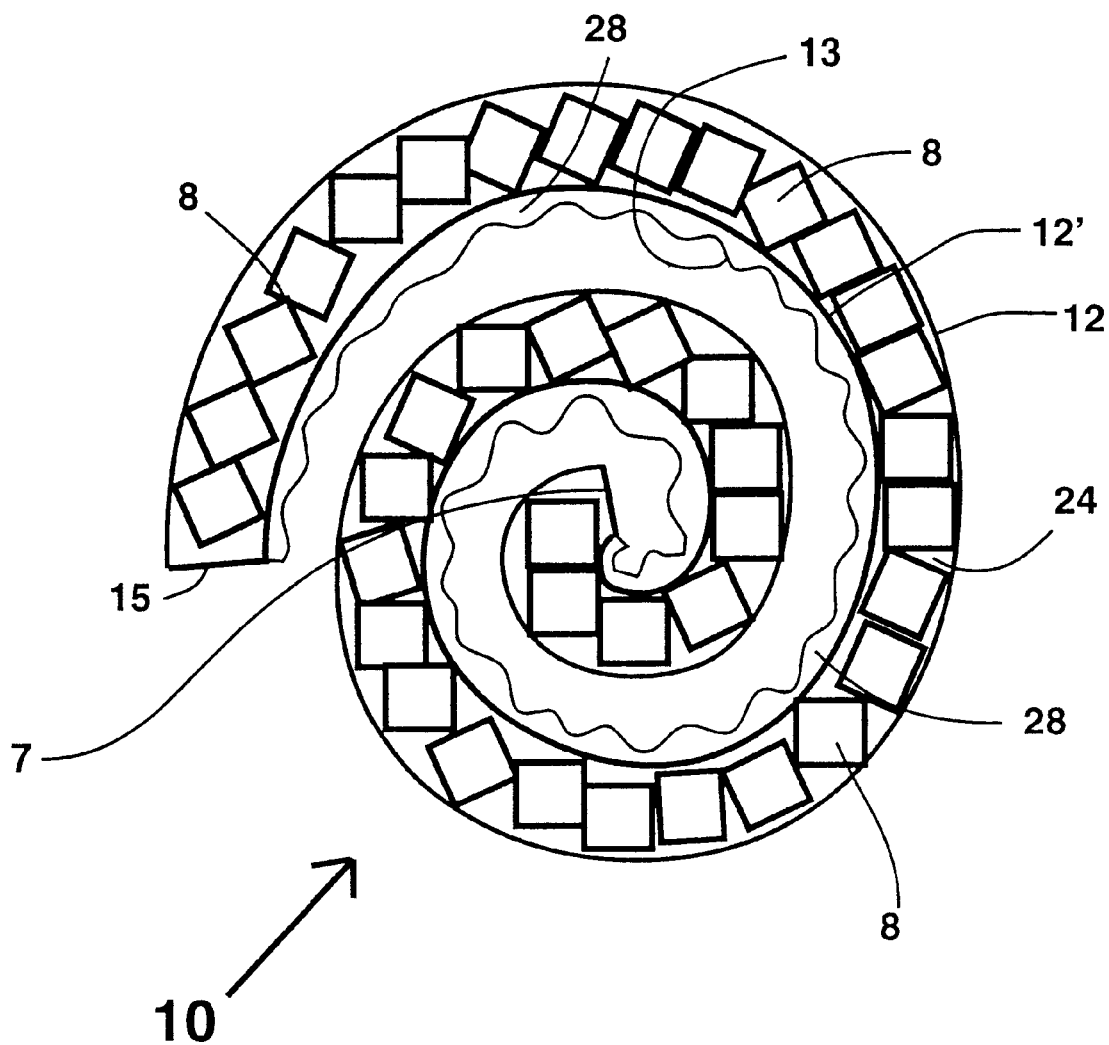
FIG. 3 is a top view of a third embodiment of the present invention.

FIG. 3 shows a third embodiment of the present invention. This embodiment uses a pair of bars 12, 12', which extend generally parallel to one another, thereby defining there between a channel 24. In this embodiment, the bars 12, 12' terminate and join there between a first end bar 15 and a second end bar 17 respectively at their first ends and second ends. Attaching to either the first bar 12, the second bar 12', or both bars 12, 12' is a chip wall 13 defining a chip channel 28 for receiving chips or pieces of a smoke producing substance, such as chips of mesquite wood or chips of hickory wood. It is preferred that this channel 28 be corrugated so as to tightly receive the pieces of the smoke producing material. Attached in such a fashion, as an adjacent heat producing block or charcoal briquette 8 is ignited, the smoke producing material adjacent thereto within the chip channel 28 will be caused to smoke from the heat. Such an arrangement allows the sequential burning of charcoal briquettes to sequentially smoke chips within the chip channel 28, thereby eliminating the need for a user of the smoker device 10 to constantly add smoke producing material.

Figure 4:
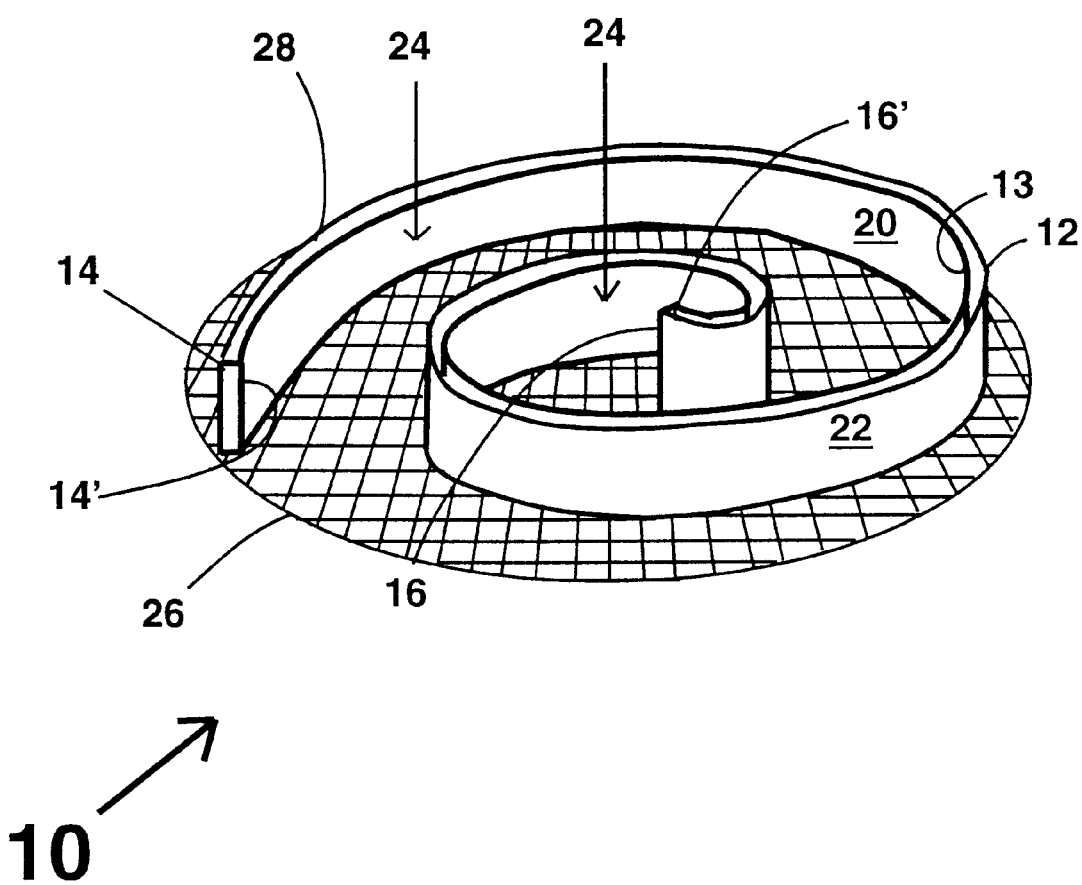
FIG. 4 is a side perspective view of a fourth embodiment of the present invention.

Referring now to FIG. 4, a fourth embodiment of the present invention 10 is shown. In this embodiment, the smoker device 10 comprises a single bar 12 extending from a first end 14 to a second end 16. Adjacent to this bar 12 exists a chip wall 13, extending from a first end 14' to a second end 16'. It is preferred that the first ends 14, 14' be joined together, and it is preferred that the second ends 16, 16' be joined together. In this embodiment, the device is shown bent into a generally circular spiral pattern, however other patterns are also envisioned and some of the possible patterns are generally represented in FIGS. 5, 6, 7, and 8. These Figures will be discussed infra.

Referring again to FIG. 4, attaching to the fuel divider device 10 along its lower most edge is a heat producing blocks support means 26. In this embodiment, the support means 26 is a grating that exists between adjacent coils of the circular spiral. However, other types of support means 26 are also envisioned.

Figure 5:
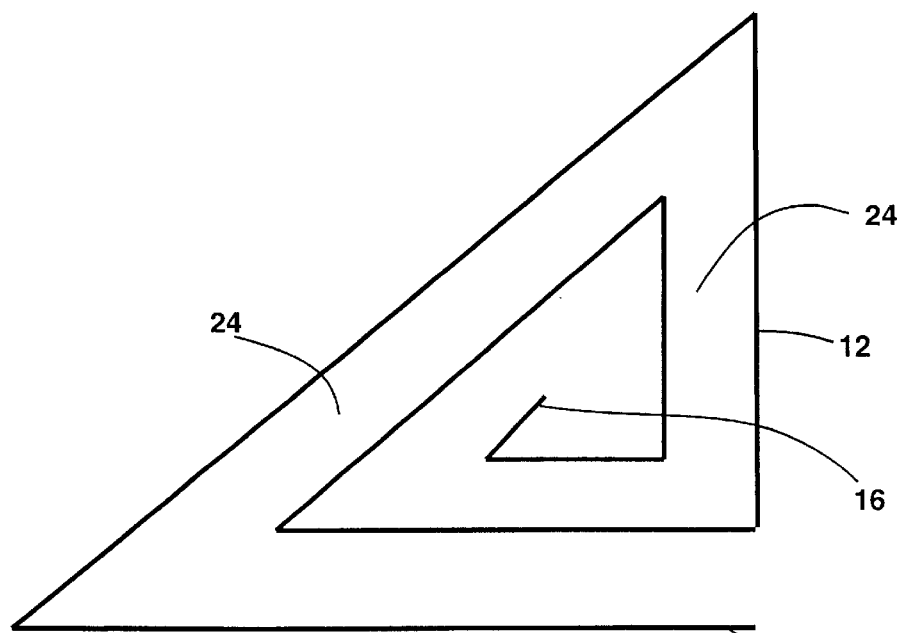
FIG. 5 shows a top view of a fifth embodiment of the present invention.

FIG. 5 shows a triangular spiral embodiment of the present invention.

Figure 6:
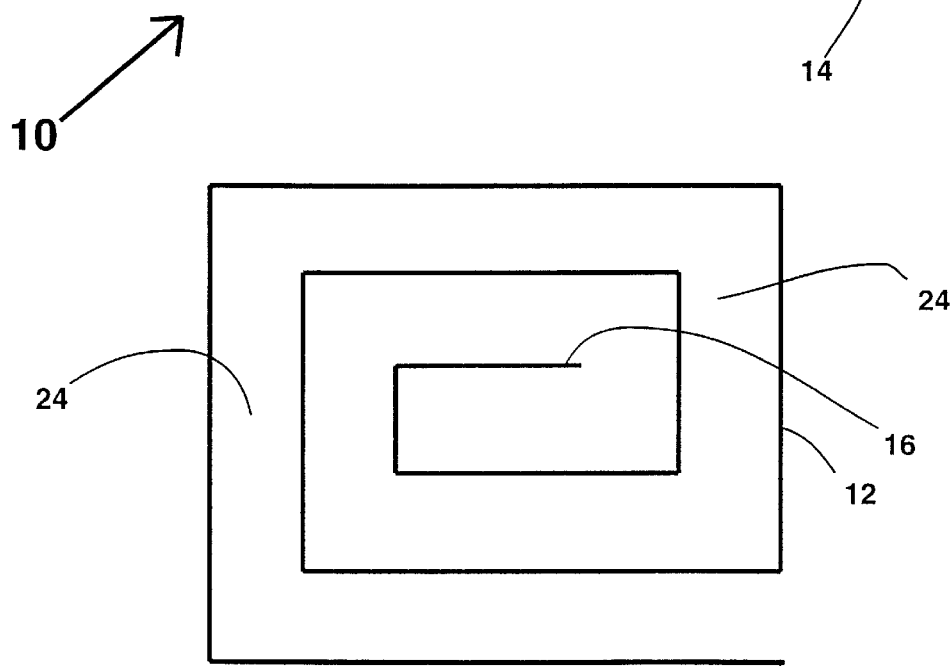
FIG. 6 shows a top view of a sixth embodiment of the present invention.

FIG. 6 shows a rectangular spiral embodiment of the present invention.

Figure 7:
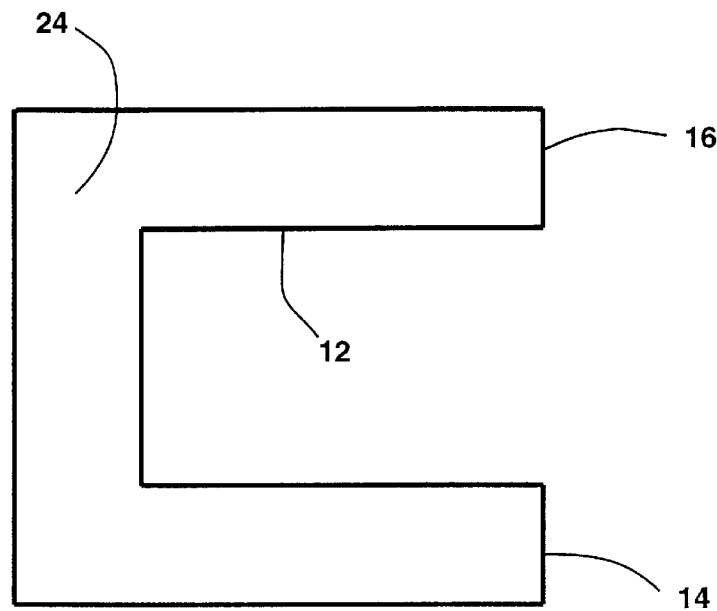
FIG. 7 shows a top view of a seventh embodiment of the present invention.

FIG. 7 shows a C-shaped, closed embodiment of the present invention.

Figure 8:
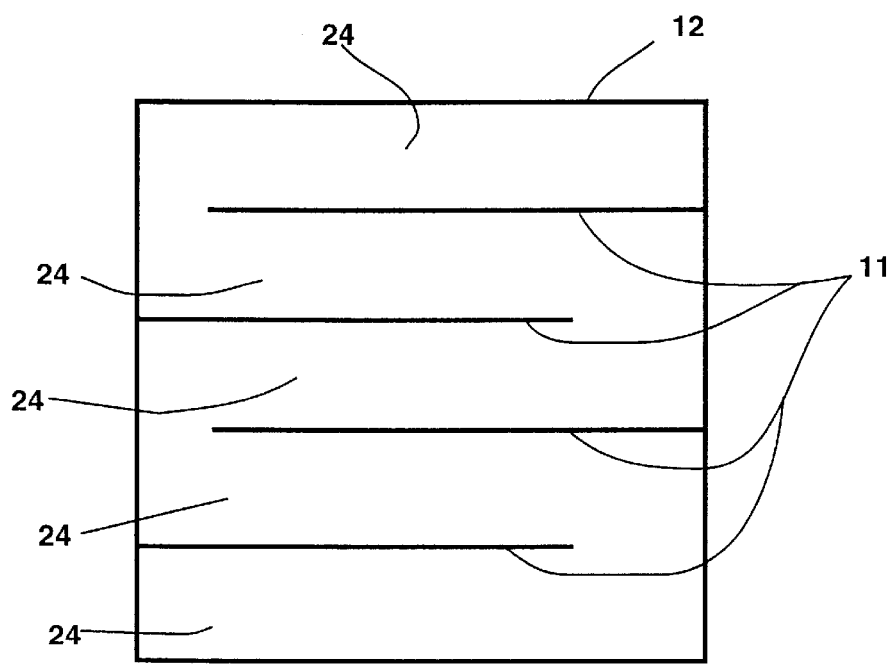
FIG. 8 shows a top view of an eighth embodiment of the present invention.

FIG. 8 shows an embodiment of the present invention having a continuous channel 24 extending therethrough, this embodiment having an outside wall bar 12 and a plurality of inner dividers 11 for defining a channel 24 for separating charcoal briquettes, thereby allowing sequential ignition in a maze fashion.

While these various embodiments show some of the possible ways to perform the present invention, what is important is not the look of the configuration but the fact that a channel is provided that allows for sequential ignition of adjacent heat producing blocks over a period of time.

Figure 9:
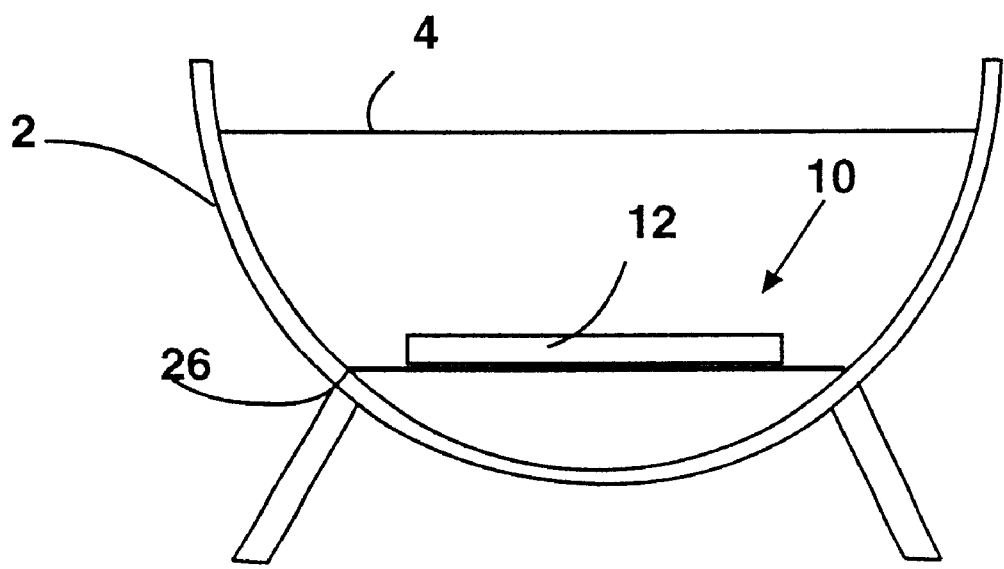
FIG. 9 shows an environmental view a ninth embodiment of the present invention.

FIG. 9 shows an environmental view of one embodiment of the present invention in use. As shown in FIG. 9, the smoker device 10, in this embodiment, having a heat producing blocks support means 26 attaching to the bottom thereof of the bar 12, said smoking device 10 is placed in the bottom of a standard barbecue grill such as those made by Weber®. This grill 2 has a grilling surface 4 which allows items to be smoked to be suspended over the fuel divider device 10. In use, the lid of the grilling device 2 would be placed on the grill and the fuel divider device would preferably be used to smoke the items placed on the grilling surface, such as fish.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A device for smoking food items, said device comprising:

at least two heat producing blocks for use as a fuel, said blocks having ends;

a structure defining a horizontal channel adapted to receive said heat producing blocks therein in an end-to-end fashion; and a heat producing block support means for holding said blocks within said channel and for ensuring sequential burning of said heat producing blocks while preventing non-sequential combustion of said heat producing blocks.

2. A device for smoking food items, said device comprising:

at least two heat producing blocks for use as a fuel, said blocks having ends;

a heat producing block support means; and a generally elongated bar having a first end extending laterally to a second end and having at least one longitudinal bend in said generally elongated bar wherein said bend defines a bar first portion and a bar second portion;

wherein the space between the bar first portion and the bar second portion defines said channel.

3. The device of claim 2, wherein said bend forms a circular spiral pattern.

4. The device of claim 2, wherein said bend forms a triangular spiral pattern.

5. The device of claim 2, wherein said bend forms a rectangular spiral pattern.

6. The vice of claim 2, wherein said bend forms an elongated U-shaped pattern.

7. The device of claim 2, wherein said charcoal briquette supporting means is a grating.

8. A device for use in a grilling device, having a grilling surface, for the smoking of foods, comprising:

an elongated bar shaped into a spiral pattern fuel divider for placement below said grilling surface; and a plurality of heat producing blocks for placement in said fuel divider below said grill;

wherein the combustion of said heat producing blocks is rate controlled by said spiral pattern fuel divider so that said heat producing blocks combust at a slower rate than normal and at a lower temperature than that obtained with said heat producing blocks without said spiral pattern fuel divider.

9. The device of claim 8, wherein said heat producing blocks are charcoal briquettes.

10. The device of claim 8, wherein said spiral pattern fuel divider comprises an elongated metal bar shaped into a circular spiral pattern.

11. A device for using charcoal briquettes for the smoking of food items, said device comprising:

a generally elongated bar having a first end extending to a second end;

wherein said elongated bar is shaped in a generally concentric pattern defining at least one continuous channel; and a charcoal briquette supporting means contacting said bar, said charcoal briquette supporting means for supporting said charcoal briquettes within said channel.

* * * * *